United States Patent [19]
Holst

[11] 3,833,097
[45] Sept. 3, 1974

[54] ANTI-LOCKING ARRANGEMENT FOR FLUID PRESSURE ACTUATED BRAKE

[76] Inventor: Jan-Olov Holst, Laduvagen 12, Uppsala, Sweden

[22] Filed: Sept. 26, 1973

[21] Appl. No.: 400,960

[52] U.S. Cl. ..... 188/181 A, 200/61.46, 303/21 CG, 303/61
[51] Int. Cl. ............................................... B60t 8/12
[58] Field of Search ............ 188/180, 181 A, 181 R; 200/61.46; 303/21 F, 21 FS, 21 CG, 61

[56] References Cited
UNITED STATES PATENTS
| | | | |
|---|---|---|---|
| 3,630,347 | 12/1971 | Davis | 303/21 CG |
| 3,690,736 | 9/1972 | Smirl et al. | 303/61 |
| 3,752,268 | 8/1973 | Gfeller | 303/21 CG X |

*Primary Examiner*—Duane A. Reger
*Attorney, Agent, or Firm*—Parrott, Bell, Seltzer, Park & Gibson

[57] ABSTRACT

In a fluid pressure actuated brake for slowing a rotating member and having a conduit through which actuating pressure is applied and a valve interposed in the conduit for controllably interrupting the application of pressure, locking of the brake is prevented by an arrangement in which forces are exerted on a mass including a flywheel supported for oscillating movement by a spring which biases the flywheel toward a central position, a coupling operatively interconnecting the flywheel and the valve and transmitting force opposing the spring force which is derived from the application of actuating pressure to the valve, and a motive device controllably exerting a force opposing the spring force. By controlling application of the last mentioned force, in response to the sensed rate of the retardation of or tendency to lock the rotating member, oscillation of a vibrating system defined by the mass and spring is initiated and maintained only during such time as the sensed rate of retardation exceeds a desired predetermined rate and such oscillating movement of the vibrating system including the mass is employed to interrupt the application of pressure to the brake.

24 Claims, 14 Drawing Figures

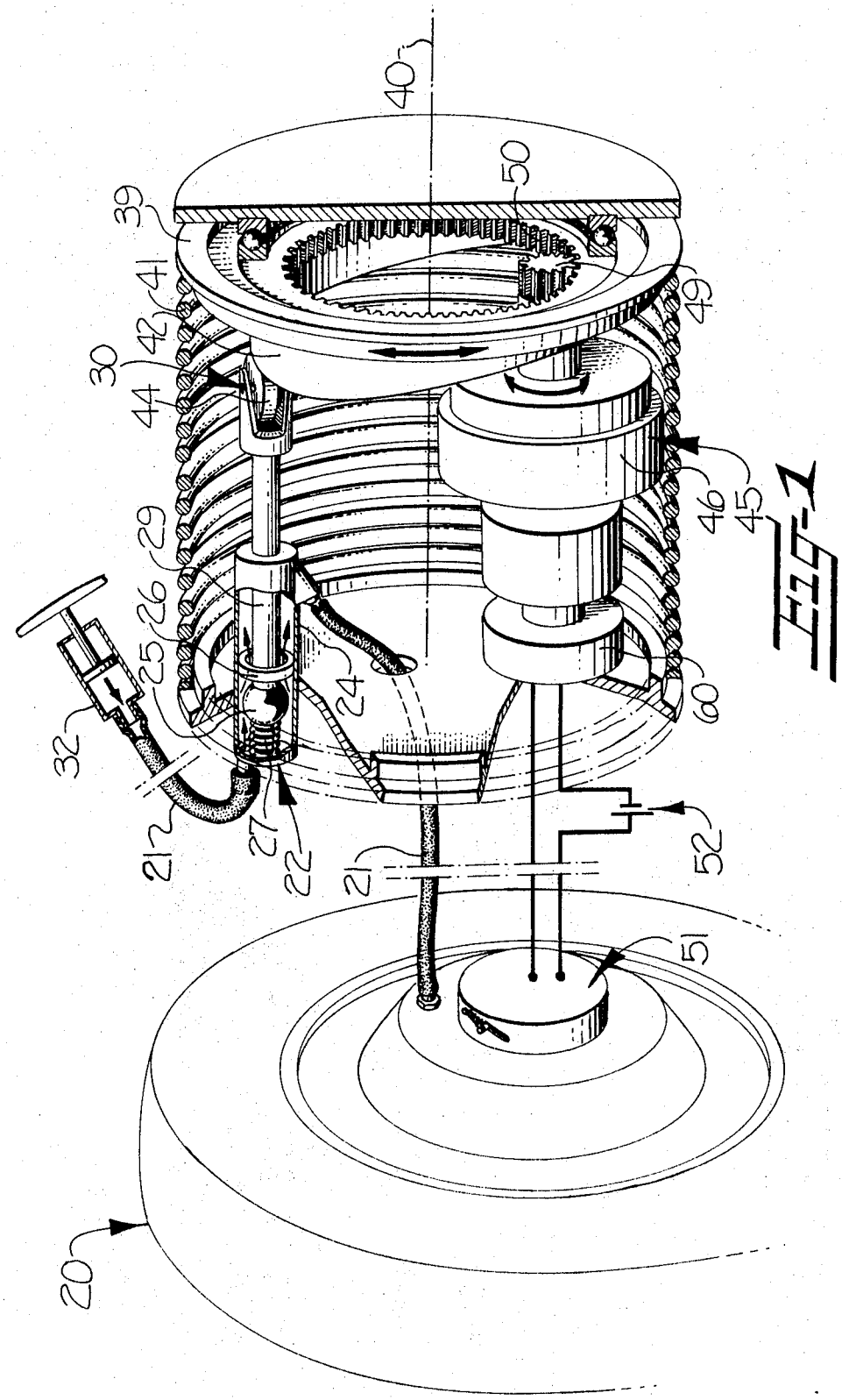

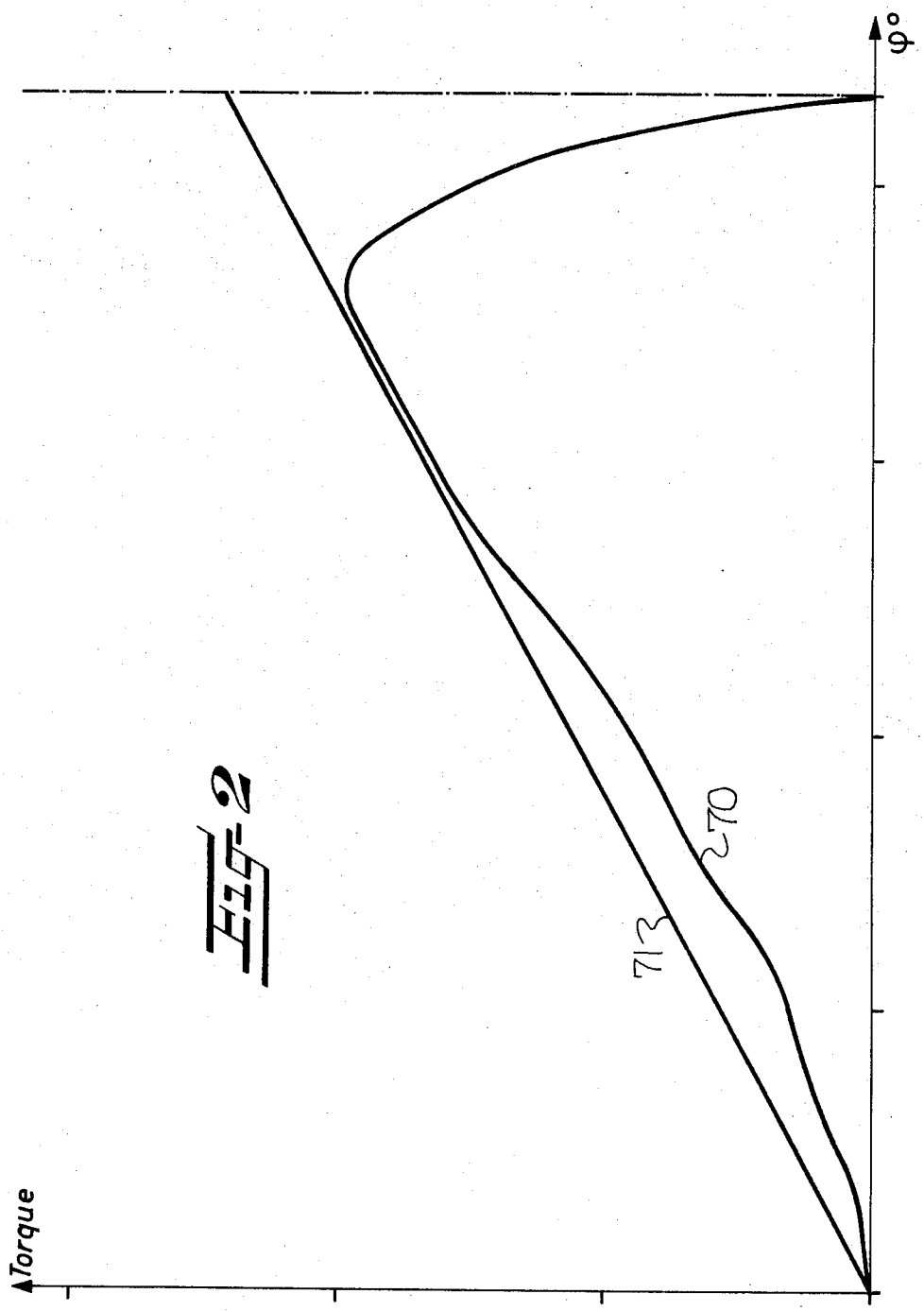

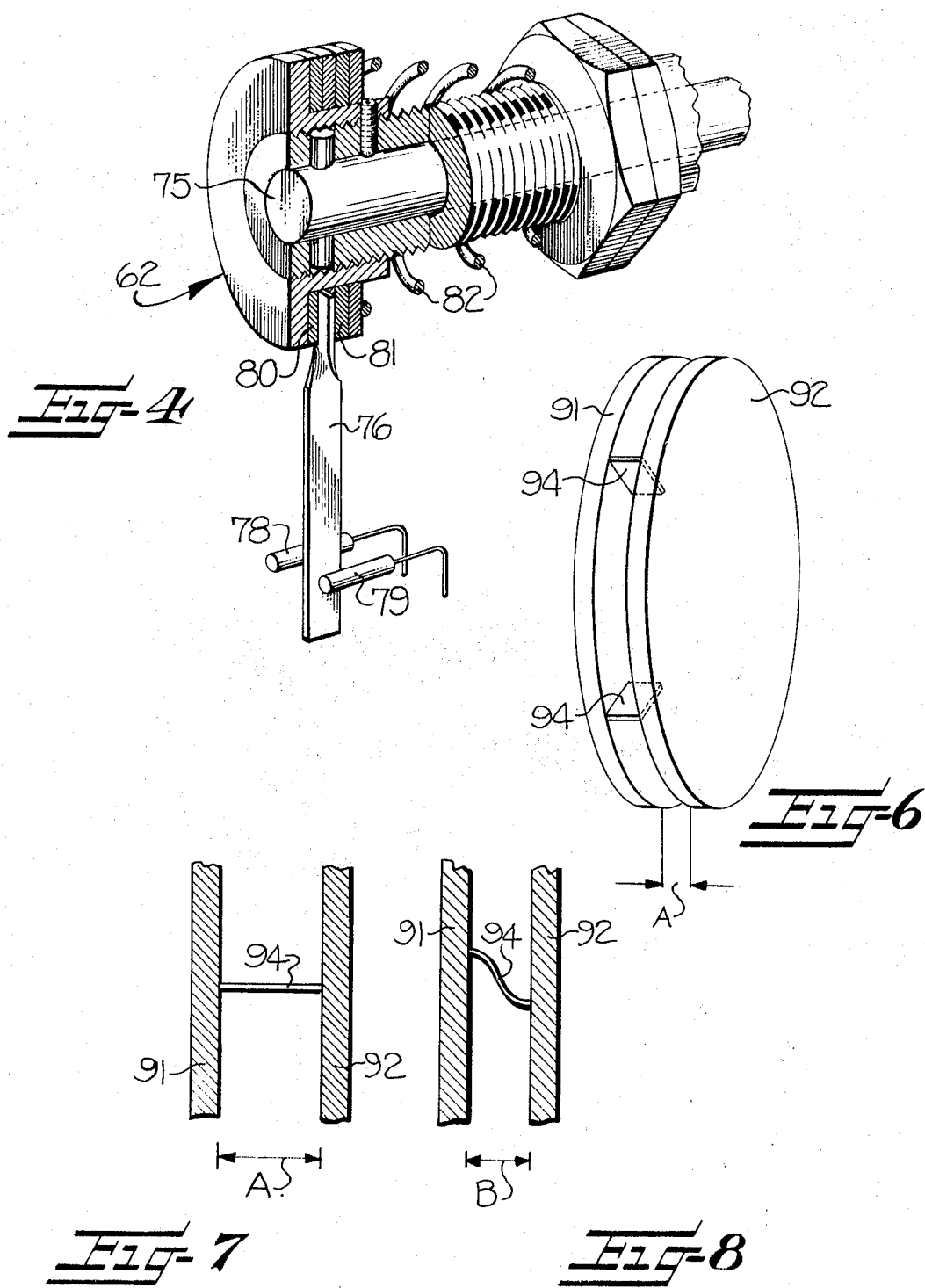

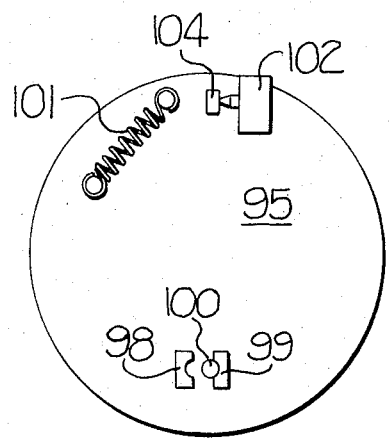
Fig-9
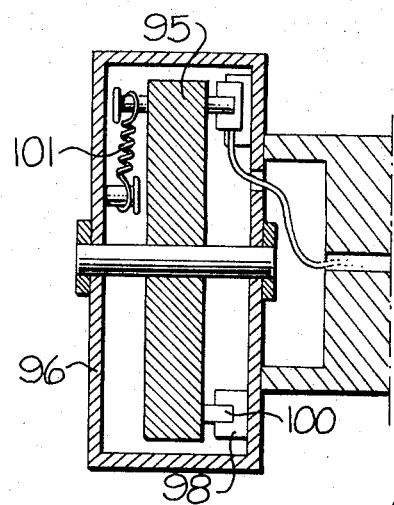
Fig-10
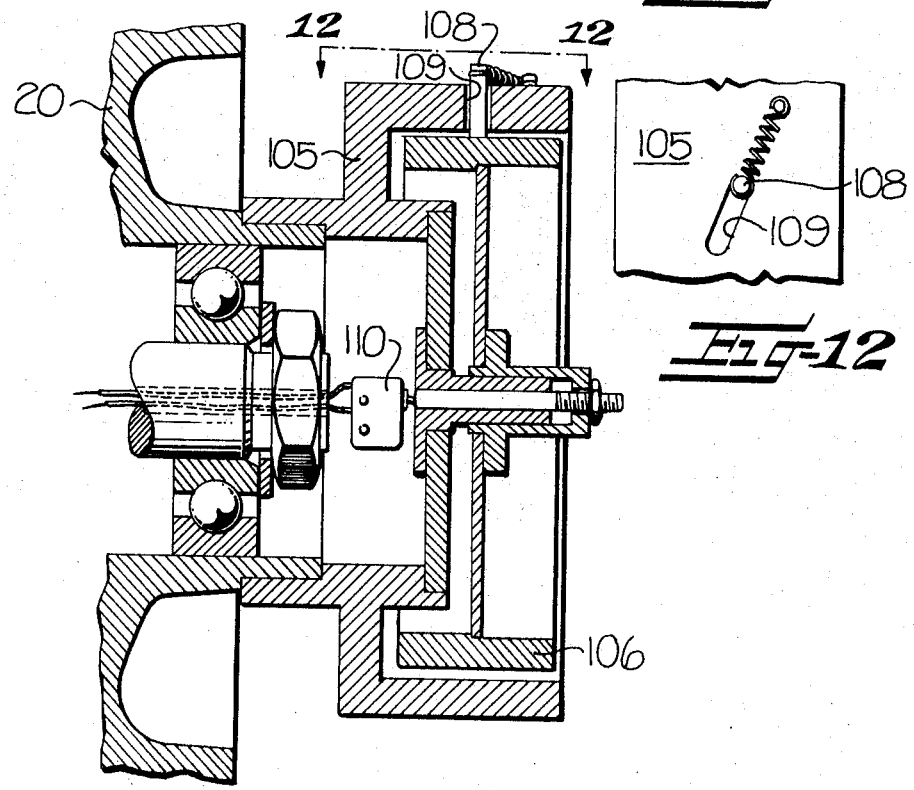
Fig-11
Fig-12

ANTI-LOCKING ARRANGEMENT FOR FLUID PRESSURE ACTUATED BRAKE

It has long been recognized that the application of brakes for slowing rotation of a rotating member is subject to a phenomenon known as "locking". Referring particularly to the use of a fluid pressure actuated brake for slowing the wheel of an automotive vehicle, locking occurs when the rolling friction between the wheel and the road surface is overcome and the wheel slides relative to the road surface. The dangers of such locking are well-known, and include loss of steering control and skidding or loss of directional stability.

While skillful drivers may overcome the dangers of such locking by modulating the braking effort or "pumping" the brake, the need for apparatus for preventing locking has long been recognized and various attempts have been made to provide such apparatus. Successful approaches to overcoming these problems are disclosed in U.S. Pat. No. 3,614,176 and related Swedish Patents 321,866; 342,786; and 344,183. As disclosed in the U.S. patent, a valve interposed in a conduit through which an actuating pressure is applied to a brake is operated by the action of a vibrating system moving at its resonant frequency, to interrupt continued application of pressure and to reduce the pressure applied so as to release the braked wheel and maintain rotation thereof. In this manner, locking of the wheel by braking the wheel to a standstill is avoided.

While the apparatus of the aforementioned U.S. patent avoids certain difficulties and deficiences of brake control known theretofore, and is particularly adaptable for relatively slow speed vehicles, certain problems have been encountered in connection with passenger automobiles and some trucks which are often driven at relatively high speeds. In particular, it has been recognized as desirable to avoid a high percentage of slip occurring before an anti-locking apparatus begins operation. That is, if the rotating member to be braked is rotating at a relatively high speed, it is desirable that an anti-locking apparatus be actuated relatively quickly after it appears that the rate of retardation or braking of the wheel is excessive, rather than delaying actuation until rotation of the member has slowed nearly to a stop. In this context, a rotating wheel having only rolling engagement with a road surface has no slip while a wheel which has only sliding motion relative to a road surface has one hundred percent slip. The apparatus of Swedish Patent 344,183 attempted to solve this problem by initiating vibration in response to sensed excessive rates of retardation, but suffered deficiencies in requiring tuning of the vibrating system and a pulsator driving the system.

It is also now recognized as desirable not to lose more braking distance for the vehicle to release of braking effect than is absolutely necessary. Therefore, it is desirable to have any anti-locking arrangement for fluid pressure actuated brakes respond to parameters of braking such as road conditions and the pressure applied by an operator to the brake pedal. In responding to such parameters, preferred anti-locking arrangements would achieve optimal braking effects.

Other desired characteristics for an anti-locking apparatus are efficiency in use of power supplied for operation thereof and avoidance of any need for tuning. In particular, it is desirable that the energy requirement for actuating an anti-locking apparatus be minimized consistent with achieving the required result. Further, it is desirable that oscillating systems need not be tuned to specific frequencies either in the factory or in the field.

Having in mind the difficulties and deficiencies mentioned hereinabove, it is an object of this invention to accomplish control over locking of a braked rotating member, such as an automotive vehicle wheel, while avoiding excessive slip before actuation of an anti-locking apparatus and while efficiently using forces present in a pressure fluid actuated brake system and eliminating any need for tuning. In realizing this object of the present invention, the rate of retardation of a rotating member being braked is sensed and, upon the sensed rate of retardation exceeding a desired predetermined rate, a controlled force is exerted on a mass which includes a flywheel supported for oscillating movement. As the mass also has exerted thereon a spring force biasing the mass toward a predetermined central position and a force derived from the application of actuating pressure to the brake, the anti-locking apparatus efficiently uses kinetic and potential energy in responding to an excessive rate of retardation irrespective of the particular rotational speed of the member to be braked.

Certain of the objects and advantages of this invention having been stated, others will become apparent from the following description and accompanying illustrations, in which:

FIG. 1 is a partly schematic, partly perspective view of an anti-locking apparatus in accordance with this invention;

FIG. 2 is a graph illustrating certain moments or torques applied to elements of the apparatus of FIG. 1;

FIG. 4 is a perspective view of a switching device employed in the circuit of FIG. 3;

FIG. 6 is a perspective view of a first form of accelerometer or retardation sensor useful in the arrangements of FIGS. 1-5;

FIG. 7 is an enlarged elevation of the sensor at FIG. 6;

FIG. 8 is a view similar to FIG. 7, illustrating subjection of the accelerometer of FIG. 6 to an excessive rate of retardation;

FIG. 9 is an elevation view of portions of a second form of accelerometer useful in the apparatus of FIGS. 1-5;

FIG. 10 is a section view of the accelerometer of FIG. 9, taken generally at a right angle to FIG. 9;

FIG. 11 is a sectional view of a third form of accelerometer useful in the apparatus of FIGS. 1-5;

FIG. 12 is a plan view of the accelerometer of FIG. 11, taken generally as indicated by the arrows in that Figure;

Figure 5:
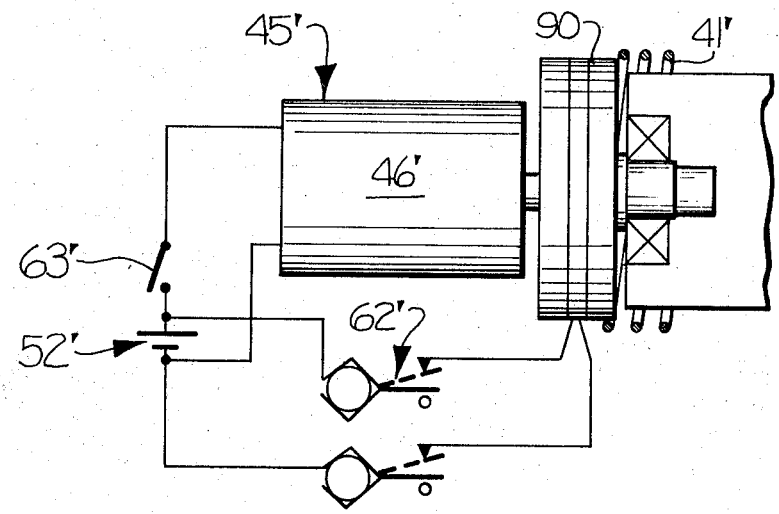
FIG. 5 is a modified form of the apparatus of FIGS. 1-4.

The description which follows and the illustrations to which reference will be had during the course of the description are contemplated as referring to the best mode for the practice of this invention known at the time that the description and illustrations are prepared. However, it is to be realized at the outset of this description that the present invention is subject to modification and change in various ways and that the description and illustrations are accordingly to be taken broadly and not understood as limiting on the scope of this invention.

Referring now more particularly to the accompanying drawings, a fluid pressure actuated brake is illustrated schematically in FIG. 1 for slowing a rotating member such as a wheel 20 of an automotive vehicle. The fluid pressure actuated brake includes a conduit 21 through which actuating pressure is applied. Interposed in the conduit 21 is a valve means, generally indicated at 22, for controllably interrupting the application of pressure to the brake which slows the wheel 20. In the form illustrated, the valve 22 includes a housing 24 within which is located a ball member 25 biased toward a closed position against a seat 26 by a spring 27. In its normal position the ball 25 is maintained spaced from the seat 26 by the action of a pin 29, which forms a portion of a coupling means generally indicated at 30 and described more fully hereinafter, and communication is opened for actuating pressure fluid to flow from a master cylinder generally indicated at 32 through the conduit 21 and an inlet provided in the housing 24, past the ball 25 and seat 26, through an outlet provided in the housing 24 and through the conduit 21 to a wheel cylinder (not visible in FIG. 1). During normal slowing of the wheel 20, such application of pressure through the conduit 21 and valve 22 results in exertion of a braking force in a conventional manner, halting the corresponding vehicle and the wheel 20 which forms a portion thereof.

In accordance with important features of this invention, a mass which includes a flywheel 39 is provided and is supported for oscillating movement. In the forms illustrated, the flywheel 39 is supported for rotation about a predetermined axis generally indicated at 40. As will be understood, the mass includes elements which are connected with the flywheel 39, move in rotation with the flywheel 39, and add inertia thereto. Hereinafter in this description, the terms "mass" and "flywheel" are used interchangeably, with it being contemplated that such usage refers to the totality or entity of elements which rotate together. As is clear from the disclosure of U.S. Pat. No. 3,614,176, hereby incorporated by reference, the mass may be arranged for linear oscillation, as an alternative.

Operatively connected with the mass including the flywheel 39 is a spring means 41 for defining therewith a vibrating system having a resonant frequency. In the form illustrated, the spring 41 is a helical torsion spring, exerting a force biasing the mass 39 toward a predetermined rotational position referred to in this description as a "central" position. That is, upon rotational movement of the mass 39 about the axis 40 and in either rotational direction away from the central position, the spring 41 exerts on the mass a force biasing the mass toward return to the central position. This results from fixing of one end of the spring 41 to the mass 39 and fixing of the other end of the spring 41 stationarily against rotation relative to the mass 39.

In the neutral or central position to which the mass 39 is biased by the spring 41, a cam 42 carried by the mass 39 cooperates with a cam follower 44 in holding the ball 25 from the seat 26 by means of the pin 29, and thereby maintaining the valve means 22 is position for application of pressure. Thus, the cam 42 and the cam follower 44 form a portion of the coupling means generally indicated at 30. This coupling means, in accordance with the present invention, serves the further function of transmitting to the mass force opposing the spring force and derived from application of actuating pressure to the valve 22. In particular, the application of actuating pressure through the conduit 21 urges the ball 25 toward the seat 26 and thereby causes the cam follower 44 to exert force against the cam 42. Upon the flywheel 39 being displaced slightly from the central position (as described more fully hereinafter), such transmission of force to the surface of the cam 42 gives rise to a vector rotating the flywheel 39 about the axis 40. In accordance with an important feature of this invention, the torque or rotational force thus applied to the mass is not sufficient, taken alone, to overcome the force with which the spring 41 biases the mass 39 toward the central position. However, the force derived from the application of actuating pressure is substantially equal to the spring force in order to accomplish a desired high efficiency of operation.

In accordance with an important feature of this invention, a motive means generally indicated at 45 is operatively connected with the mass 39 for controllably exerting on the mass a limited force opposing the spring force. In the form illustrated in FIG. 1, the motive means 45 is a reversible direct current electrical motor 46, energized in such a manner as to rotate in alternate directions, as described more fully hereinafter. The shaft of the electrical motor 46 is connected with the mass by means of a pinion gear 49 which engages an encircling gear 50 formed in the flywheel.

The exertion on the mass 39 of the rotational or torque force originating from the motive means 45 is controlled by a first control means generally indicated at 51 which is operatively connected with the wheel 20 for sensing the rate of retardation thereof and for signaling the occurrence of a rate of retardation in excess of a predetermined rate. The first control means 51 preferably takes the form of an accelerometer device, and several alternative arrangements for such a device will be described with particularity hereinafter. Upon deceleration of the rotation of the wheel 20, the conductive state of a switch is changed to thereby provide a signal upon the occurrence of a rate of retardation of the wheel 20 which exceeds a predetermined rate. Preferably, the switch is closed to deliver electrical current from the conventional automotive 12 volt source generally indicated at 52 when the rate of retardation of the wheel 20 is sufficiently high to indicate that slippage is occurring. In realization of the objects of this invention, such signaling can occur irrespective of the particular rotational speed of the wheel 20 or the particular velocity of the associated automotive vehicle. However, it will be understood that the rate of retardation of the wheel and the rate of recurrence of excessive retardation will depend in part upon road conditions and pressures applied by an operator to the master cylinder 32. Thus, the signaling contributes to the realization of optimal braking effects.

Figure 3:
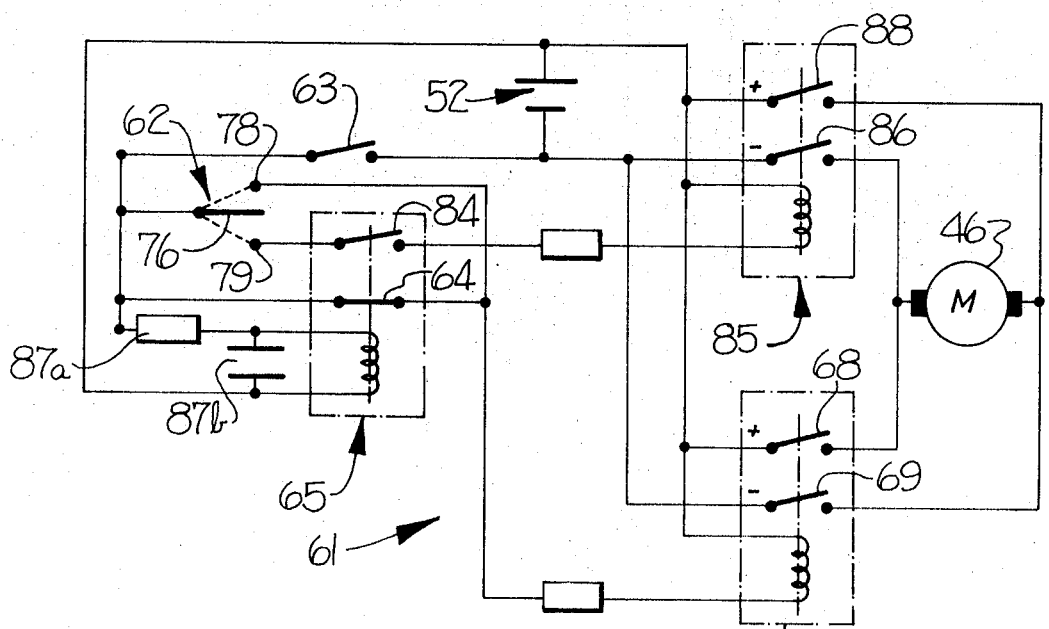
FIG. 3 is a diagrammatic representation of an electrical circuit used in the apparatus of FIG. 1.

In accordance with an important feature of this invention, a second control means generally indicated at 60 is operatively connected with the first control means 51 and with the mass 39 for responding to the signaling of an excessive rate of retardation of the wheel 20 by actuating the motive means 45 to exert force on the mass 39 and for responding to movement of the mass 39 by periodically interrupting such application of force from the motive means 45. Where the motive means 45 is a reversible electrical motor 46, the second control means 60 includes a starting circuit generally indicated at 61 (FIG. 3) and a polarity reversing switch means generally indicated at 62 (FIG. 4). The reversing switch 62 and the signaling switch 63 of the first control means 51 cooperate with the start circuit 61 and are illustrated as portions of that circuit in FIG. 3.

In operation, upon signaling by closure of the switch 63 that the rate of retardation of the wheel 20 is excessive, slippage is occurring and locking is imminent, voltage is applied through a normally closed contact 64 of a start control relay 65 and energizes a first direction drive relay 66. By means of normally open contacts 68, 69 of the first drive relay 66, the electrical motor 46 is energized to rotate in a first direction and transmits such rotation to the mass 39 through the coupling gears 49, 50. As the angular position of the mass 39 changes and the mass moves against the opposing force of the spring 41, the spring force is also opposed by the force derived from application of actuating pressure to the valve 22, as transmitted through the cam follower 44 and cam 42.

In accordance with an important feature of this invention, the force required from the electric motor 46 is relatively small and is represented (in FIG. 2) by the separation of a line 70 representing the torque or rotational moment applied to the mass 39 by means of the cam follower 44 and cam 42 and a line 71 indicating the torque or rotational moment exerted by the spring 41. The curves are set out in a coordinate system in which the abscissa represents the angular position of the rotating mass 39 while the ordinate represents the rotational moment or torque exerted.

As will be recognized, were it possible to slowly rotate the mass 39 with the motive means 45 and the brake pressure or cam torque, it would be possible to attain a position in which the torque exerted by the electric motor 46 and through the cam 42 would exactly balance the torque exerted by the spring 41, and the mass 39 would come to rest in that extreme position. However, in accordance with this invention, the rotational speed imparted to the mass 39 on initial energization of the electrical motor 46 and movement from the central position is such as to give rise to certain momentum in the vibrating system formed by the mass 39 and spring 41. Advantage is taken of the existence of this momentum in operating the reversing switch means 62 in such a manner as to periodically interrupt exertion of force by the motive means 45 in opposition to the force of the spring 41.

In particular, the reversing switch 62 used in conjunction with a reversible electric motor 46 comprises a shaft 75 which rotates in coordination with rotational movement of the mass 39. Frictionally engaged with the shaft 75 and moving therewith is a contact leaf 76 which is displaceable between engagement with associated first and second contacts 78, 79. Frictional engagement of the leaf 76 with the shaft 75 is assured by interposition of the leaf 76 between a pair of friction discs 80, 81, controllably urged together by a spring 82. By adjusting the pressure exerted by the spring 82, the drag which moves the leaf 76 toward the direction of rotation of the shaft 75 may be varied.

With rotation of the electrical motor 46 in a first direction having been initiated by energization of the drive relay 66 in the manner described hereinabove, the lead 76 contacts the corresponding contact 78 and maintains energization of the first drive relay 66 as the normally closed contact 64 of the start relay is opened and a normally open contact 84 thereof is closed upon energization of the start relay 65 through a delay circuit formed by a resistor 87a and a capacitor 87b.

Upon the electrical motor 46 driving the mass 39 to the position at which the force of the spring 41 is balanced by the combined effects of the opposing forces applied through the cam 42 and the motor 46, the momentum given to the mass 39 at the time rotation thereof was initiated by the motor 46 is recovered, causing the mass 39 to rotate slightly beyond the equilibrium position. Upon depletion of this momentum, the force of the spring 41 initiates counter-rotational movement of the mass 39 back toward the central position. This small counter-rotational movement disengages the leaf 76 of the reversing switch means 62 from the contact 78 which has maintained energization of the first drive relay 66, thereby interrupting the exertion of force on the mass 39 by the motive means 45. In the absence of the opposing force exerted by the motive means 45, the force exerted by the spring 41 (being greater than the force derived from the application of pressure as illustrated by the relationships of FIG. 2) returns the mass to the central position.

It is to be noted that operation as here described occurs without regard to the precise extent or scope of displacement of the mass from the central position. In point of fact, the flow between kinetic and potential energy which occurs in the apparatus of this invention is such that the extent of displacement of the mass from the central position increases during successive part cycles. Desirably, the maximum displacemnt is reached quickly in a device intended for a light, fast vehicle such as a passenger automobile requiring quick pressure release, while more part cycles may be acceptable for a heavier vehicle. Optimum design for any given use will balance the need for quick response against the economics of choosing the motive means, as slower action will permit lower initial and operating costs by accommodating a greater number part cycles before maximum displacement is reached. In one actual operating embodiment, the first one-half cycle of movement displaces the mass through approximately 80 percent of the maximum displacement realized during operation; the second half cycle displaces the mass through approximately 90 percent; and full displacement is reached in the third half cycle. Nevertheless, in each such half cycle interruption of the force exerted by the motive means occurs by operation of the reversing switch 62 as described.

Where a reversible electrical motor 46 is used as the motive means, reverse movement of the mass 39 back toward the central position displaces the leaf 76 of the reversing switch 62 into engagement with an alternate contact 79. By such engagement, a second drive relay 85 is energized and, through closure of normally open contacts 86, 88 thereof, the electrical motor 46 is driven in an opposite direction of rotation. Such opposite rotation of the electrical motor aids in building momentum in the mass 39 to carry the mass beyond the central position and repeat the operation described hereinabove during movement of the mass in the second rotational direction.

As the mass 39 oscillates between extreme rotational positions and across the central position, the ball 25 of the valve 22 moves between unseated and seated positions relative to the seat 26; and the pressure delivered to the wheel cylinder 38 is reduced to release braking forces in an action similar to "pumping". As the ball 25 is unseated, force derived from the application of actuating pressure to the valve 22 is again transmitted to the mass 39 in opposition to the force of the spring 41.

Oscillation of the mass 39 involves an interchange between kinetic energy and potential energy. As operation continues, kinetic energy of the mass is at a minimum when the mass is at rest at the central position and when the mass is in either extreme rotational position, reaching a peak during movement between the extreme rotational positions. Conversely, potential energy stored in the spring is at a maximum as the mass reaches the extreme rotational positions and is minimized as the mass moves through the central position.

During the first quarter of an oscillation (as the mass moves from rest at the central position to a first extreme rotational position), the force of the motor opposes the force of the spring. During the second quarter of an oscillation (as the mass returns from a first extreme rotational position to the central position), the force of the motor is added to the force of the spring. During the third quarter, the motor force again opposes the spring force. The motor force and spring force act in the same direction again during the fourth quarter. In all instances, the force derived from the actuating fluid pressure opposes the spring force.

In connection with this operation, the interruption of the application of braking pressure releases the wheel 20 for more free rotation and typically reduces the rate of retardation of the wheel to an acceptable rate not in excess of the predetermined rate. Upon such an occurrence, the first control means 51 interrupts operation of the second control means 60. In the illustrated embodiment, the switch 63 is opened to remove voltage from the start circuit 61 and electrical motor 46. Upon this occurrence, the remaining forces acting on the mass 39 are dominated by the force of the spring 41, and the mass is returned to the predetermined central position. In an operating embodiment of the invention as here illustrated and described, it has been noted that such return of the mass 39 to the central position frequently leaves the contact leaf 76 of the reversing switch means 62 in an intermediate position spaced between the associated contacts 78, 79 and it is for this reason that the start circuit 61 is provided. As has been discovered from an operating embodiment of this invention, the vibrating system acts so quickly in releasing and re-establishing braking effect that interruption of operation of the second control 60 directly by the first control 51 may be undesirable in certain vehicles, in which case a delay circuit (not shown) may be inserted to maintain energization of the circuit 61 for any desired period.

The operation of the arrangement of this invention as described hereinabove is repeated in a series of cycles or from time to time as required by sensed rates of retardation of the associated wheel 20. While described with particular reference to a single wheel, it is contemplated that this arrangement will be duplicated as required for whatever number of wheels are to be equipped with an anti-locking apparatus. Typically, it is desirable to provide at least the two rear wheels of an automotive vehicle with such a device, and it may be preferred to equip all four wheels of the vehicle. While a vehicle so equipped is viewed as having the significant advantage of independent control for each wheel, responsive to the individual slip conditions of the wheels grouped control over two or more wheels is also a possibility. It is within the contemplation of this invention that such grouped control may respond to electronic circuitry which measures and weights or averages rates of retardation for each of the two or more wheels. Further, such electronic circuitry may be employed to select and actuate individual ones of a plurality of antilocking apparatus in accordance with this invention.

It is contemplated that this invention may be practiced with certain variations from the preferred embodiment described hereinabove. By way of example only, and not by way of limitation, one such modified form is illustrated in FIG. 5, wherein elements corresponding to those identified heretofore have the same reference character applied thereto with the addition of prime notation. Inasmuch as substantial similarities exist between the modified arrangement and that described above, the present description will be directed specifically to the point of distinction and will not repeat discussion of common features.

In the modified form, the motive means 45' includes an electrical motor 46' which rotates in a single direction only. By means of a clutch device 90 interposed between the output shaft of the electric motor 46' and the connection by which rotational motion is transmitted to the mass, force is applied to the mass only while the mass is moving in the corresponding one rotational direction. To that end, the clutch 90 may be an electrically operated clutch such as a magnetic particle device and may be controlled by a reversing switch means 62'. As illustrated, the switch means 62' is of double pole, single throw construction for positively energizing and de-energizing the clutch 90.

It is to be noted that in both of the forms of this invention described hereinabove, the use of the motive means 45, 45' to initiate and maintain oscillation of a vibrating system, in response to movement of the mass, provides the important advantage of avoiding any need for tuning the vibrating system or a driving oscillator for the vibrating system. In particular, manufacturing tolerances for springs and for components of the mass will, of necessity, introduce variations in those characteristics of an individual device which determine the natural resonant frequency of the vibrating system. Further, it is anticipated that the precise natural resonant frequency of a vibrating system in the apparatus of this invention may vary with the hydraulic pressure generated by an operator acting on the master cylinder, making it exceedingly difficult to foresee and accommodate the exact natural resonant frequency. Such "tuning" of a device or a group of devices to a precise natural resonant frequency is avoided, in the arrangement of this invention, through the particular cooperation of the motive means and the control responsive to movement of the mass. As a further result, specific components of an apparatus of this invention, for example springs, flywheels or electrical motors, may be replaced or interchanged without adversely affecting the operation of the apparatus. Thus, normal manufacturing tolerances are readily accommodated while achieving optimal braking effect in accordance with this invention and avoiding any necessity of precisely matching components.

As was mentioned briefly hereinabove, the first control means 51 may embody accelerometers in various forms. A first form of such an accelerometer is illustrated in FIGS. 6-8, where it will be noted that two disc or plate members 91, 92 are held in spaced relation by a plurality of leaf spring members 94. By means of the springs 94, the discs 91, 92 are normally held at a predetermined spaced distance. Upon rotation of the discs 91, 92, this spaced relation (indicated as the dimension A in FIG. 7) will be maintained for so long as the rotational or angular relationship of the discs is substantially the same. In the event that one of the discs should be rotated relative to the other, the force of the springs 94 will be overcome and, by bending of the springs, the discs will be drawn more closely together (as indicated by the dimension B in FIG. 8). In use, one of the discs 91, 92 is secured to the wheel 24 for rotation therewith while the other of the discs is free to move as required for signaling the occurrence of a rate of retardation of the wheel in excess of a predetermined rate.

A second form of accelerometer is illustrated in FIGS. 9 and 10, where a rotor member 95 is mounted for rotation within a housing 96 which may be secured to the wheel 20. The extent of rotational movement of the rotor 95 relative to the housing 96 is limited by a pair of stop members 98, 99 and a cooperating pin 100 positioned therebetween. The predetermined rate of retardation which must be exceeded in determined by a spring 101 which couples the rotor 95 to the housing 96, while signaling the occurrence of an excessive rate of retardation is accomplished by a switch 102 operated by a protrusion 104.

A third form of accelerometer is illustrated in FIGS. 1, 11, and 12, wherein a housing 105 fixed to a wheel 20 for rotation therewith encircles a rotor 106. By means of a pin 108 protruding from the rotor 106 through an angled slot 109 formed in the housing 105, relative rotation of the rotor 106 and the housing 105 produces a movement of the rotor axially of the center of rotation of the wheel. Such axial movement operates a switch 110 functioning as the switch 63 described hereinabove.

Figure 13:
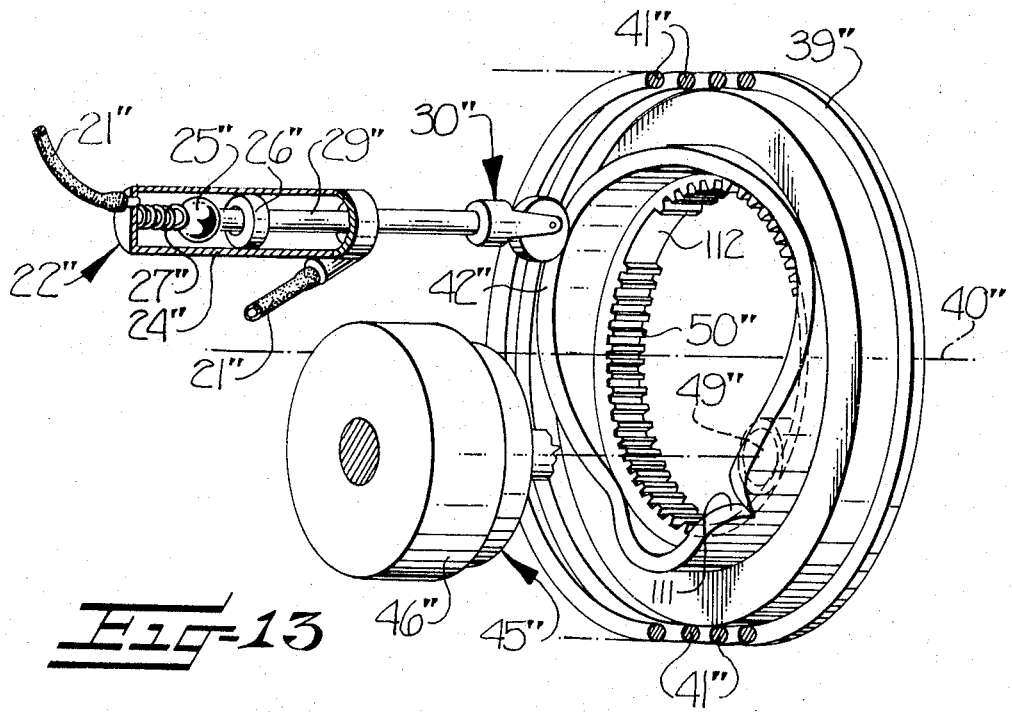
FIG. 13 is a perspective view similar to FIG. 1 showing portions of a second modified form of the apparatus of FIGS. 1 through 4, provided with a fail safe feature.
Figure 14:
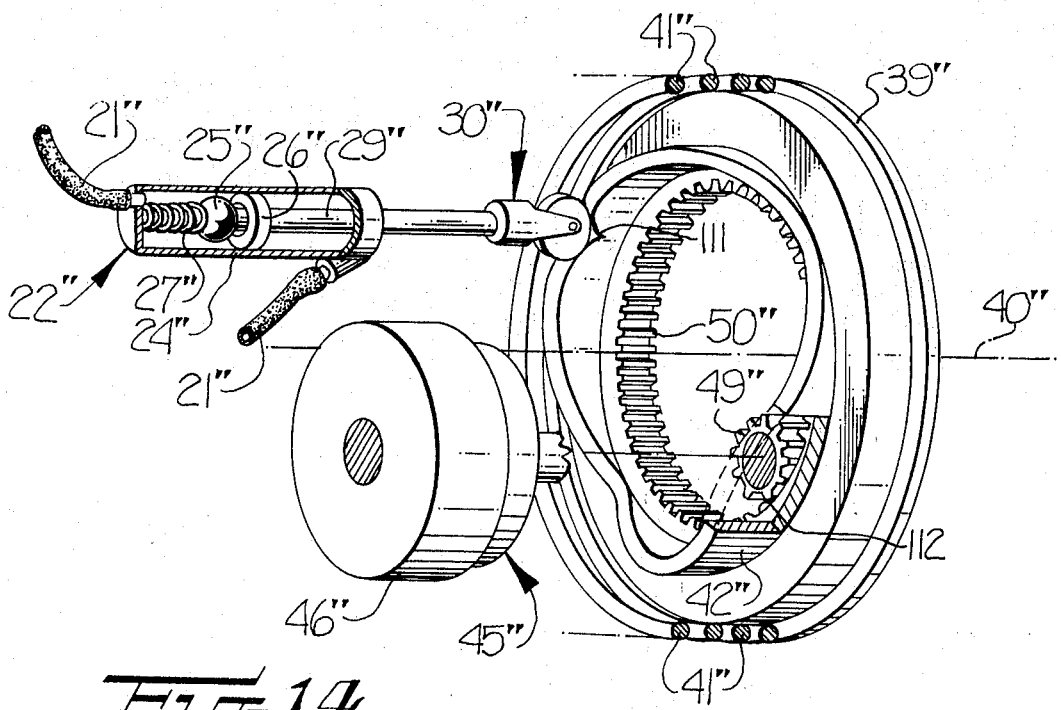
FIG. 14 is a view similar to FIG. 13, showing the apparatus of FIG. 13 in the failed position.

It is contemplated that, under certain circumstances, it would be desirable to have the pressure controlling valve of an apparatus in accordance with this invention blocked in an open position in the event that the apparatus might fail by breakage of the spring or the like. A modified form of the apparatus in accordance with this invention which provides such operation is illustrated in FIGS. 13 and 14, wherein elements corresponding to those identified heretofore have the same reference character applied thereto with the addition of double prime notation. Inasmuch as substantial similarities exist between the modified arrangement and those described above, the description which follows will be directed specifically to the points of distinction and will not repeat discussion of common features.

As discussed hereinabove, when the flywheel 39'' is in the central or neutral position, the ball 25'' is held from the seat 26'' due to the cooperation of the cam follower 44'' and the cam 42'', which has a high point at the central position (FIG. 13 and FIG. 1). In the second modified form of FIGS. 13 and 14, the cam 42'' is provided with a reverse curved portion or "notched" portion 111, diametrically opposite the high point at the central or neutral position. Further, the gear 50'' within the flywheel 39'' is provided with an interrupted portion 112, diametrically opposite the notched portion 111 of the cam 42''. These features cooperate in order to assure that the ball 25'' is blocked in an unseated condition, displaced from the seat 26'', in the event that the spring 41'' should break.

In practice, the next cycle of indicated operation of the apparatus in accordance with this invention following breaking of the spring 41'' will result in the electrical motor 46'' driving the flywheel 39'' in rotation due to the engagement of the gears 49''', 50''. Inasmuch as the opposing force of the spring 41'' would be absent due to breakage of the spring, the flywheel 39'' is driven beyond its normal displacement about the axis 40'' by the electrical motor 46''. As the cam follower 44'' moves toward the reverse curved portion 111 of the cam 42'', the ball 25'' is unseated from the seat 26''. Further, hydraulic pressures then acting on the cam follower 44'' cause the cam follower to enter into the notched portion 111 just as the drive gear 49'' reaches the interrupted portion 112 of the gear 50''. The cam follower 44'' then is forced into the notched portion 111 of the cam 42'', just as the gear 49'' is freed for rotation without engagement with the gear 50'' of the flywheel 30''. Thus, continued signaling for energization of the motor 46'' has no adverse affect and the pressure controlling valve is blocked in open condition.

It is to be noted that the preferred embodiments for this invention here described and illustrated have employed relatively simple cam configurations and relatively direct connections of the motive means 45 with the mass 39. However, operating embodiments of arrangements incorporating this invention have been constructed in which various multi-lobe cam designs and gearing arrangements have been used to achieve differing relationships among the movements described generally above. Knowing of such possibilities, it is to be noted that specific descriptive language has been used with reference to the illustrated embodiments, but that such language is intended to have a general meaning and is not to be taken as limiting on this invention.

What is claimed is:

1. In a fluid pressure actuated brake for slowing a rotating member and having a conduit through which actuating pressure is applied and valve means interposed in said conduit for controllably interrupting and releasing the application of pressure, an arrangement for preventing locking of the brake and comprising:
   a mass supported for oscillating movement, in alternate directions from a central position,
   spring means operatively connected with said mass for defining therewith a vibrating system having a resonant frequency and for exerting force biasing said mass toward said central position,
   coupling means operatively interconnecting said mass and said valve means for maintaining said valve means in position for application of pressure while said mass is in said central position and for transmitting to said mass force opposing said spring means force and derived from application of actuating pressure to said valve means, motive means operatively connected with said mass for controllably exerting on said mass force opposing said spring means force, first control means operatively connected with said rotating member for sensing the rate of retardation thereof and for signaling the occurrence of a rate of retardation in excess of a predetermined rate, and second control means operatively connected with said first control means, said means and said motive means for responding to the signaling of the occurrence of an excessive rate of retardation of said rotating member by actuating said motive means to exert force on said mass and for responding to movement of said mass by periodically interrupting actuation of said motive means.

said motive means force displacing said mass from said central position to initate oscillating movement thereof and cooperating with said coupling means force during application of pressure in maintaining such oscillation of said mass for so long as the sensed rate of retardation exceeds said desired predetermined rate.

2. Apparatus according to claim 1 wherein said coupling means force is less than the opposed spring means force at all positions of displacement of said mass from said central position and further wherein said motive means force is a limited force sufficient when added to said coupling means force to displace said mass through a determinable oscillatory movement.

3. Apparatus according to claim 1 wherein said mass is supported for rotary oscillating movement about a predetermined axis and said spring means comprises a helical torsion spring having one end fixed to said mass.

4. Apparatus according to claim 3 wherein said helical torsion spring is mounted concentric with said predetermined axis and has the other end thereof stationarily fixed relative to said mass.

5. Apparatus according to claim 1 wherein said coupling means comprises cam surface means mounted for movement with said mass and cooperating cam follower means operatively connected with said valve means for displacing said valve means upon movement of said mass toward and away from said central position and for applying to said cam surface means force derived from application of actuating pressure to said valve means.

6. Apparatus according to claim 5 particularly adapted for blocking said valve means in flow permitting position in the event of failure and wherein said cam surface means defines a notch portion remote from a normal range of displacement of said mass. said notch portion for receiving and entrapping said cam follower means upon movement of said mass beyond said normal range upon occurrence of failure.

7. Apparatus according to claim 1 wherein said first control means comprises a first member fixed to said rotating member for rotation therewith about a rotational axis, a second member mounted for rotational movement relative to said first member and about the rotational axis thereof, spring means operatively connecting said first and second members for biasing said members toward a predetermined relationship one to another and for imposing on asid second member forces normally coupling said first and second members together for rotation, and electrical switch means operatively associated with said second member for actuation thereby upon subjection of said members to rates of change of said coupled rotation forces sufficient to overcome the biasing force of said spring means.

8. Apparatus according to claim 1 wherein said motive means comprises a reversible electrical motor and said control means comprises reversing switch means electrically connected with said reversible motor for periodically reversing the direction of rotation thereof and thereby for driving said mass in alternate directions of oscillation.

9. Apparatus according to claim 1 wherein said motive means comprises an electrical motor and said second control means comprises a direction responsive switch means electrically connected for periodically interrupting the exertion of force by said motor and thereby for driving said mass only in one direction of oscillation.

10. Apparatus according to claim 9 wherein said second control means further comprises clutch means interposed between said electrical motor and said mass and responsive to said direction responsive switch means for interconnecting and disconnecting said electrical motor and said mass.

11. Apparatus according to claim 1 further comprising driven gear means mounted on said mass for transferring said motive means force thereto and drive gear means meshing with said driven gear means and operatively connected with said motive means for effective transfer of motive means force to said driven gear means.

12. Apparatus according to claim 11 particularly adapted for blocking said valve means in flow permitting position in the event of failure and wherein said driven gear means defines an interrupted portion remote from a normal range of displacement of said mass. said interrupted portion for effectively disengaging said drive gear means and said driven gear means upon movement of said mass beyond said normal range upon occurrence of failure.

13. Apparatus for controllably interrupting the application of pressure through a valve means and comprising:

a mass supported for rotary oscillating movement about a predetermined axis and in alternate directions from a central position, helical torsion spring means having one end thereof fixed to said mass and the other end thereof stationarily fixed relative to said mass, said spring means defining with said mass a vibrating system having a resonant frequency and exerting force biasing said mass toward said central position, means operatively interconnecting said mass and said valve for maintaining said valve in flow permitting position while said mass is in said central position and for transmitting to said mass upon displacement thereof from said central position force opposing said spring means force and derived from pressure within said valve means, electrical motor means for driving connection with said mass and for controllably exerting on said mass a force opposing said spring means force, and control means operatively connected with said mass and said motor means and operable for actuating said motor means to exert force displacing said mass from said central position and for responding to movement of said mass by periodically interrupting exertion of force by said motor means.

14. Apparatus according to claim 13 wherein said electrical motor means comprises a reversible motor for driving said mass in movement in alternate directions and further wherein said motor means and said control means cooperate for exertion of said motor means force in opposition to said spring means force during the first and third quarters of each cycle of oscillatory displacement of said mass from said central position and for exertion of said motor means force in supplementation of said spring means force during the second and fourth quarter of each such cycle.

15. In an automotive vehicle braking system having a rotating wheel, a conduit through which fluid under pressure is delivered for braking the rotation of the wheel, a valve interposed in the conduit for controllably interrupting and releasing the application of pressure, a vibrating system of a mass and spring operatively connected with the valve for normally maintaining the valve in position for application of pressure and cooperating with the valve in interrupting and releasing the application of pressure, and a sensor rotating with the wheel for detecting the rate of retardation of rotation thereof and for signaling the occurrence of a rate of retardation in excess of a predetermined rate, that improvement which comprises motive means mechanically coupled to said mass for controllably exerting thereon force opposing said spring and control means operatively connected with said sensor, said mass and said motive means for responding to the signaling of the occurrence of an excessive rate of retardation of said wheel by actuating said motive means to exert force on said mass and for responding to movement of said mass by periodically interrupting exertion of force by said motive means.

16. In an automotive vehicle hydraulic pressure brake system having an oscillating mass-spring system for actuating a valve in a hydraulic line to alternately release and apply hydraulic pressure, that improvement which comprises motive means for exerting on the mass force moving the mass in a first direction, means for sensing a reversal in direction of movement of the mass, and means responsive to said sensing means for interrupting the exertion of said motive means force on said mass upon the sensed reversal in direction of movement of the mass.

17. In a hydraulic pressure actuated brake for slowing a rotating member and having a conduit through which hydraulic pressure is applied and valve means interposed in said conduit for controllably interrupting and releasing the application of pressure, an arrangement for preventing locking of the brake and comprising:

a mass supported for oscillating movement, in alternate directions from a central position,
spring means operatively connected with said mass for defining therewith a vibrating system and for exerting force biasing said mass toward said central position,
coupling means operatively interconnecting said mass and said valve means for maintaining said valve means in position for application of hydraulic pressure to said brake while said mass is in said central position and for transmitting to said mass force opposing said spring means force and derived from application of hydraulic pressure to said valve means,
motive means operatively connected with said mass for controllably exerting on said mass force at least initially opposing said spring means force,
first control means for sensing the tendency of said rotating member to lock and for signaling the occurrence of such a tendency, and
second control means operatively connected with said first control means, said mass and said motive means for responding to the signaling of the occurrence of a tendency of said rotating member to lock by actuating said motive means to exert force on said mass and including means for sensing reversal of direction of movement of said mass and for interrupting such exertion of force when reversal of movement of said mass is sensed,
said motive means force displacing said mass from said central position to initiate oscillating movement thereof and cooperating with said coupling means force during application of hydraulic pressure in maintaining such oscillation of said mass for so long as there is a sensed tendency of the rotating member to lock.

18. Apparatus according to claim 17 wherein said motive means comprises a reversible electrical motor and said means for interrupting exertion of force comprises means for reversing the direction of rotation of said electrical motor.

19. Apparatus according to claim 17 wherein said coupling means force is less than the opposed spring means force at all positions of displacement of said mass from said central position and further wherein said motive means force is a limited force sufficient when added to said coupling means force to maintain oscillatory movement of said mass.

20. Apparatus according to claim 19 wherein said coupling means comprises cam surface means mounted for movement in coordination with said mass and cooperating cam follower means operatively connected with said valve means for displacing said valve means upon movement of said mass toward and away from said central position and for applying to said cam surface means force derived from application of hydraulic pressure to said valve means.

21. Apparatus according to claim 17 wherein said mass is supported for rotary oscillating movement about a predetermined axis and said spring means comprises a helical torsion spring mounted concentric with said axis and having one end fixed to said mass and the other end stationarily fixed relative to said mass.

22. A method of avoiding locking of a rotatable member which is braked by a fluid pressure brake comprising the steps of:
passing pressurized actuating fluid for the brake through a control valve,
biasing a member of an oscillating system toward a central state while permitting displacement thereof in alternate directions from the central state, normally maintaining the valve in flow permitting condition in correlation with the central state of the oscillating system member, sensing any occurrence of a rate of retardation of the rotatable member which exceeds a predetermined rate indicative of a tendency of the rotatable member to lock, responding to sensed excessive rates of retardation by imposing on the oscillating system member energy effecting initiation of displacement thereof from the central state in opposition to the bias exerted thereon, interrupting braking of the rotatable member by changing the control valve to flow and pressure releasing blocking condition in correlation with displacement of the oscillating system member.

sensing initiation of return of the oscillating system member toward the central state, responding to sensed initiation of return by interrupting imposition of energy on the oscillating system member, and continuing periodic imposition of energy on the oscillating system member for so long as the rate of retardation of the rotatable member is excessive.

23. In a method of avoiding locking of a rotatable member braked by a fluid pressure brake which includes passing pressurized actuating fluid for the brake through a control valve, biasing a member of an oscillating system toward a central state while permitting displacement thereof in alternate directions from the central state, normally maintaining the valve in flow permitting condition in correlation with the central state of the oscillating system member, and interrupting braking of the rotatable member by changing the control valve to flow blocking and pressure releasing condition in correlation with displacement of the oscillating system member. that improvement which comprises the steps of:

sensing any occurrence of a rate of retardation of the rotatable member which exceeds a predetermined rate indicative of a tendency of the rotatable member to lock, responding to sensed excessive rates of retardation by imposing on the oscillating system member energy effecting initiation of displacement thereof from the central state in opposition to the bias exerted thereon, sensing initiation of return of the oscillating system member toward the central state, responding to sensed initiation of return by interrupting imposition of energy on the oscillating system member, and continuing periodic imposition of energy on the oscillating system member for so long as the rate of retardation of the rotatable member is excessive.

24. In a method of avoiding locking of a rotatable member braked by a hydraulic pressure brake which includes passing hydraulic fluid which actuates the brake from a master cylinder through a control valve, biasing a member of a mechanical oscillating system toward a central position while permitting displacement thereof in alternate directions from the central position, normally maintaining the valve in flow permitting condition while the oscillating system member is in the central position, and interrupting braking of the rotatable member by changing the control valve to flow blocking and pressure releasing condition as the oscillating system member is displaced from the central position. that improvement which comprises the steps of:

sensing any occurrence of a rate of retardation of the rotatable member which exceeds a predetermined rate indicative of a tendency of the rotatable member to lock, responding to sensed excessive rates of retardation by exerting on the oscillating system member energy for effecting initiation of displacement thereof from the central position in position to the bias exerted thereon, sensing initiation of return of the oscillating system member toward the central position, responding to sensed initiation of return by interrupting the exertion of the force on the oscillating system member, and continuing periodic exertion of force on the oscillating system member for so long as the rate of retardation of the rotatable member is excessive.

* * * * *

UNITED STATES PATENT OFFICE
CERTIFICATE OF CORRECTION

Patent No. 3,833,097                    Dated September 3, 1974

Inventor(s) Jan-Olov Holst

It is certified that error appears in the above-identified patent and that said Letters Patent are hereby corrected as shown below:

Column 1, line 32, delete "control" and insert therefor --controls--

Column 4, line 5, delete "is" and insert therefor --in--

Column 6, line 42, correct the spelling of --displacement--

Column 9, line 37, delete "in" and insert therefor --is--

Column 12, line 3, correct the spelling of --said--

Column 15, line 14, following "flow" insert --blocking--

Column 15, line 15, following "release" delete "blocking"

Column 16, line 34, delete "position" (second occurrence) and insert therefor --opposition--

Signed and sealed this 5th day of November 1974.

(SEAL)
Attest:

McCOY M. GIBSON JR.                     C. MARSHALL DANN
Attesting Officer                       Commissioner of Patents